(12) United States Patent
Sun et al.

(10) Patent No.: US 12,309,711 B2
(45) Date of Patent: May 20, 2025

(54) POWER CONTROL PARAMETER CONFIGURATION METHOD, TERMINAL AND NETWORK SIDE DEVICE

(71) Applicant: DATANG MOBILE COMMUNICATIONS EQUIPMENT CO., LTD., Beijing (CN)

(72) Inventors: Wei Sun, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 520 days.

(21) Appl. No.: 17/635,279

(22) PCT Filed: Aug. 11, 2020

(86) PCT No.: PCT/CN2020/108379
§ 371 (c)(1),
(2) Date: Feb. 14, 2022

(87) PCT Pub. No.: WO2021/027805
PCT Pub. Date: Feb. 18, 2021

(65) Prior Publication Data
US 2022/0295417 A1    Sep. 15, 2022

(30) Foreign Application Priority Data
Aug. 15, 2019    (CN) .......................... 201910754869.8

(51) Int. Cl.
*H04B 7/00*       (2006.01)
*H04W 52/14*      (2009.01)
*H04W 52/24*      (2009.01)

(52) U.S. Cl.
CPC ....... *H04W 52/242* (2013.01); *H04W 52/146* (2013.01)

(58) Field of Classification Search
CPC ............. H04W 52/242; H04W 52/146; H04W 52/0209; H04W 52/325; H04W 52/04; H04W 52/18
See application file for complete search history.

(56) References Cited

U.S. PATENT DOCUMENTS

2017/0126388 A1    5/2017    Li
2018/0262313 A1    9/2018    Nam et al.
(Continued)

FOREIGN PATENT DOCUMENTS

CN    108632971 A    10/2018
CN    109151969 A    1/2019
(Continued)

OTHER PUBLICATIONS

International Search Report for PCT Application PCT/CN2020/108379 issued on Oct. 30, 2020 and its English Translation provided by WIPO.
(Continued)

*Primary Examiner* — Tuan Pham
(74) *Attorney, Agent, or Firm* — Ladas & Parry, LLP

(57) ABSTRACT

The present disclosure provides a power control parameter configuration method, a terminal and a network side device. The power control parameter configuration method includes: obtaining, by a terminal, a QCL relationship indicated by a network side device for an uplink signal; determining, by the terminal, at least one of a power control parameter or a path loss reference signal corresponding to the QCL relationship, the power control parameter being associated with large-scale information for the QCL relationship, the path loss reference signal being associated with a reference signal in the QCL relationship; and determining, by the terminal, uplink transmission power in accordance with at least one of the power control parameter or the path loss (Continued)

loss reference signal, and transmitting the uplink signal in accordance with the uplink transmission power.

15 Claims, 3 Drawing Sheets

(56) References Cited

U.S. PATENT DOCUMENTS

| | | | |
|---|---|---|---|
| 2018/0332541 A1 | 11/2018 | Liu et al. | |
| 2019/0059058 A1* | 2/2019 | Chen | H04W 52/242 |
| 2019/0373592 A1* | 12/2019 | Ji | H04B 7/063 |
| 2020/0015229 A1* | 1/2020 | Yang | H04W 72/0446 |
| 2020/0022087 A1 | 1/2020 | Dou et al. | |
| 2020/0178280 A1 | 6/2020 | Guan et al. | |
| 2020/0187128 A1 | 6/2020 | Yao et al. | |
| 2020/0221441 A1 | 7/2020 | Chen | |
| 2020/0275379 A1 | 8/2020 | Sun et al. | |
| 2020/0404593 A1 | 12/2020 | Yao et al. | |

FOREIGN PATENT DOCUMENTS

| | | |
|---|---|---|
| CN | 109392144 A | 2/2019 |
| CN | 109495959 A | 3/2019 |
| CN | 109803362 A | 5/2019 |
| CN | 109842926 A | 6/2019 |
| EP | 3585111 A1 | 12/2019 |
| EP | 3661292 A1 | 6/2020 |
| EP | 3713312 A1 | 9/2020 |
| EP | 3962182 A1 | 3/2022 |
| WO | 2018228437 A1 | 12/2018 |
| WO | 2019056278 A | 3/2019 |
| WO | 2019096317 A1 | 5/2019 |

OTHER PUBLICATIONS

Written Opinion for PCT Application PCT/CN2020/108379 issued on Oct. 30, 2020, and its English Translation provided by WIPO.
Internationally Preliminary Report on Patentability for PCT/CN2020/108379 issued on Feb. 8, 2022, and English translation provided by WIPO.
First Office Action and search report for Chinese Patent Application 201910754869.8 issued on Jun. 15, 2021, and its English translation provided by Global Dossier.
Extended European Search Report for European Patent Application 20852530.3 issued on Sep. 8, 2022.

* cited by examiner

POWER CONTROL PARAMETER CONFIGURATION METHOD, TERMINAL AND NETWORK SIDE DEVICE

CROSS-REFERENCE TO RELATED APPLICATIONS

The present application is the U.S. national phase of PCT Application No. PCT/CN2020/108379 filed on Aug. 11, 2020, which claims a priority of the Chinese patent application 201910754869.8 filed on Aug. 15, 2019, the disclosures of which are incorporated herein by reference in their entireties.

TECHNICAL FIELD

The present disclosure relates to the field of communication technology, in particular to a power control parameter configuration method, a terminal and a network side device.

BACKGROUND

In some communication systems, a power control parameter is configured independently, and selected in accordance with a Sounding Reference Signal (SRS) resource. In this regard, in an uplink multi-panel (also called as antenna panel or antenna group) multi-beam scenario for a terminal, the power control parameter may probably be selected inappropriately, leading to degraded uplink transmission performance.

SUMMARY

An object of the present disclosure is to provide a power control parameter configuration method, a terminal and a network side device, so as to solve the problem in the related art where the uplink transmission performance is degraded.

In one aspect, the present disclosure provides in some embodiments a power control parameter configuration method, including: obtaining, by a terminal, a Quasi Co-Location (QCL) relationship indicated by a network side device for an uplink signal; determining, by the terminal, at least one of a power control parameter or a path loss reference signal corresponding to the QCL relationship, the power control parameter being associated with large-scale information for the QCL relationship, the path loss reference signal being associated with a reference signal in the QCL relationship; and determining uplink transmission power in accordance with at least one of the power control parameter or the path loss reference signal, and transmitting the uplink signal in accordance with the uplink transmission power.

In some possible embodiments of the present disclosure, the power control parameter includes at least one of a path loss compensation factor or a target received power.

In some possible embodiments of the present disclosure, in the case that the reference signal in the QCL relationship is a downlink reference signal, the path loss reference signal is the downlink reference signal, or in the case that the reference signal in the QCL relationship is an uplink reference signal, the path loss reference signal is a QCL downlink reference signal for the uplink reference signal.

In some possible embodiments of the present disclosure, in the case that a path loss of the large-scale information is a first path loss, the path loss compensation factor is a first path loss compensation factor and the target received power is first target received power, or the path loss compensation factor is a second path loss compensation factor and the target received power is second target received power; and in the case that fading of the large-scale information is a second path loss, the path loss compensation factor is a third path loss compensation factor and the target received power is third target received power. The first path loss is greater than the second path loss, the first path loss compensation factor is greater than the third path loss compensation factor, the first target received power is greater than the third target received power, the second path loss compensation factor is smaller than the third path loss compensation factor, and the second target received power is smaller than the third target received power.

In some possible embodiments of the present disclosure, the power control parameter is a power control parameter carried in configuration information for the QCL relationship; or the power control parameter is a power control parameter obtained through performing a first operation on the power control parameter in the configuration information for the QCL relationship and a power control parameter stored in the terminal.

In some possible embodiments of the present disclosure, the power control parameter includes a power control parameter of at least one of a Physical Uplink Control Channel (PUCCH), a Physical uplink shared channel (PUSCH) or an SRS, and the power control parameters indicating at least one of the PUCCH, the PUSCH or the SRS in the configuration information are configured independently or in a jointly manner.

In some possible embodiments of the present disclosure, the power control parameter is one or more power control parameters in multiple power control parameters corresponding to one or more identifiers, the identifier includes an identifier configured through the configuration information for the QCL relationship, and the multiple power control parameters are configured in advance; or the power control parameter is one or more power control parameters from a power control parameter set indicated by Downlink Control Information (DCI), and the power control parameter set is configured for the QCL relationship in advance.

In some possible embodiments of the present disclosure, the power control parameter includes one or more power control parameters indicating at least one of a PUCCH, a PUSCH or an SRS, one or more identifiers of the one or more power control parameters for PUSCH are one or more identifiers configured through the configuration information, one or more identifiers of the one or more power control parameters for SRS are one or more identifiers configured through the configuration information or one or more identifiers configured in an SRS request, and one or more identifiers of the one or more power control parameters for PUCCH are one or more identifiers configured through the configuration information, Radio Resource Control (RRC) or a Medium Access Control Control Element (MAC CE).

In another aspect, the present disclosure provides in some embodiments a power control parameter configuration method, including: configuring, by a network side device, at least one of a power control parameter or a path loss reference signal corresponding to a QCL relationship, the power control parameter being determined in accordance with large-scale information for the QCL relationship, the path loss reference signal being determined in accordance with a reference signal in the QCL relationship; and indicating, by the network side device, the QCL relationship as well as at least one of the power control parameter or the path loss reference signal to a terminal.

In some possible embodiments of the present disclosure, the power control parameter includes at least one of a path loss compensation factor or a target received power.

In some possible embodiments of the present disclosure, in the case that the reference signal in the QCL relationship is a downlink reference signal, the path loss reference signal is the downlink reference signal, or in the case that the reference signal in the QCL relationship is an uplink reference signal, the path loss reference signal is a QCL downlink reference signal for the uplink reference signal.

In some possible embodiments of the present disclosure, in the case that a path loss of the large-scale information is a first path loss, the path loss compensation factor is a first path loss compensation factor and the target received power is first target received power, or the path loss compensation factor is a second path loss compensation factor and the target received power is second target received power; and in the case that fading of the large-scale information is a second path loss, the path loss compensation factor is a third path loss compensation factor and the target received power is third target received power. The first path loss is greater than the second path loss, the first path loss compensation factor is greater than the third path loss compensation factor, the first target received power is greater than the third target received power, the second path loss compensation factor is smaller than the third path loss compensation factor, and the second target received power is smaller than the third target received power.

In some possible embodiments of the present disclosure, the power control parameter is indicated by the network side device through configuration information for the QCL relationship; or the power control parameter is a power control parameter obtained through performing a first operation on the power control parameter in the configuration information for the QCL relationship and a power control parameter stored in the terminal.

In some possible embodiments of the present disclosure, the power control parameter includes one or more power control parameters indicating at least one of a PUCCH, a PUSCH or an SRS, and the power control parameters indicating at least one of the PUCCH, the PUSCH or the SRS in the configuration information are configured independently or in a jointly manner.

In some possible embodiments of the present disclosure, the power control parameter is indicated by the network side device in multiple power control parameters through an identifier, the identifier includes an identifier configured through the configuration information for the QCL relationship, and the multiple power control parameters are configured in advance; or the power control parameter is indicated by the network side device in a power control parameter set through DCI, and the power control parameter set is configured for the QCL relationship in advance.

In some possible embodiments of the present disclosure, the power control parameter includes one or more power control parameters indicating at least one of a PUCCH, a PUSCH or an SRS, one or more identifiers of the one or more power control parameters for PUSCH are one or more identifiers configured through the configuration information, one or more identifiers of the one or more power control parameters for SRS are one or more identifiers configured through the configuration information or one or more identifiers configured in an SRS request, and one or more identifiers of the one or more power control parameters for PUCCH are one or more identifiers configured through the configuration information, RRC or an MAC CE.

In yet another aspect, the present disclosure provides in some embodiments a terminal, including: an obtaining module configured to obtain a QCL relationship indicated by a network side device for an uplink signal; a determination module configured to determine at least one of a power control parameter or a path loss reference signal corresponding to the QCL relationship, the power control parameter being associated with large-scale information for the QCL relationship, the path loss reference signal being associated with a reference signal in the QCL relationship; and a transmission module configured to determine uplink transmission power in accordance with at least one of the power control parameter or the path loss reference signal, and transmit the uplink signal in accordance with the uplink transmission power.

In some possible embodiments of the present disclosure, the power control parameter includes at least one of a path loss compensation factor or a target received power.

In still yet another aspect, the present disclosure provides in some embodiments a network side device, including: a configuration module configured to configure at least one of a power control parameter or a path loss reference signal corresponding to a QCL relationship, the power control parameter being determined in accordance with large-scale information for the QCL relationship, the path loss reference signal being determined in accordance with a reference signal in the QCL relationship; and an indication module configured to indicate the QCL relationship as well as at least one of the power control parameter or the path loss reference signal to a terminal.

In some possible embodiments of the present disclosure, the power control parameter includes at least one of a path loss compensation factor or a target received power.

In still yet another aspect, the present disclosure provides in some embodiments a terminal, including a transceiver, a memory, a processor, and a program stored in the memory and executed by the processor. The transceiver is configured to obtain a QCL relationship indicated by a network side device for an uplink signal. The transceiver or the processor is configured to determine at least one of a power control parameter or a path loss reference signal corresponding to the QCL relationship, the power control parameter is associated with large-scale information for the QCL relationship, and the path loss reference signal is associated with a reference signal in the QCL relationship. The transceiver is further configured to determine uplink transmission power in accordance with at least one of the power control parameter or the path loss reference signal, and transmit the uplink signal in accordance with the uplink transmission power.

In some possible embodiments of the present disclosure, the power control parameter includes at least one of a path loss compensation factor or a target received power.

In some possible embodiments of the present disclosure, the power control parameter is a power control parameter carried in configuration information for the QCL relationship; or the power control parameter is a power control parameter obtained through performing a first operation on the power control parameter in the configuration information for the QCL relationship and a power control parameter stored in the terminal.

In some possible embodiments of the present disclosure, the power control parameter is one or more power control parameters in multiple power control parameters corresponding to one or more identifiers, the identifier includes an identifier configured through the configuration information for the QCL relationship, and the multiple power control parameters are configured in advance; or the power control parameter is one or more power control parameters from a power control parameter set indicated by DCI, the power control parameter is one or more power control parameters from a power control parameter set indicated by DCI, the power control parameter is one or more power control parameters from a power control parameter set indicated by DCI, the power control parameter is one or more power control parameters from a power control parameter set indicated by DCI, and the power control parameter set is configured for the QCL relationship in advance.

In still yet another aspect, the present disclosure provides in some embodiments a network side device, including a transceiver, a memory, a processor, and a program stored in the memory and executed by the processor. The transceiver or the processor is configured to configure at least one of a power control parameter or a path loss reference signal corresponding to a QCL relationship, the power control parameter is determined in accordance with large-scale information for the QCL relationship, and the path loss reference signal is determined in accordance with a reference signal in the QCL relationship. The transceiver is configured to indicate the QCL relationship as well as at least one of the power control parameter or the path loss reference signal to a terminal.

In some possible embodiments of the present disclosure, the power control parameter includes at least one of a path loss compensation factor or a target received power.

In some possible embodiments of the present disclosure, the power control parameter is indicated by the network side device through configuration information for the QCL relationship; or the power control parameter is a power control parameter obtained through performing a first operation on the power control parameter in the configuration information for the QCL relationship and a power control parameter stored in the terminal.

In some possible embodiments of the present disclosure, the power control parameter is one or more power control parameters in multiple power control parameters corresponding to one or more identifiers, the one or more identifiers include an identifier configured through the configuration information for the QCL relationship, and the multiple power control parameters are configured in advance; or the power control parameter is one or more power control parameters from a power control parameter set indicated by Downlink Control Information (DCI), and the power control parameter set is configured for the QCL relationship in advance.

In still yet another aspect, the present disclosure provides in some embodiments a computer-readable storage medium storing therein a computer program. The computer program is executed by a processor so as to implement steps in the above-mentioned power control parameter configuration method for the terminal, or steps in the above-mentioned power control parameter configuration method for the network side device.

According to the embodiments of the present disclosure, the terminal obtains the QCL relationship indicated by the network side device for the uplink signal. Next, the terminal determines at least one of the power control parameter or the path loss reference signal corresponding to the QCL relationship, the power control parameter is associated with the large-scale information for the QCL relationship, and the path loss reference signal is associated with the reference signal in the QCL relationship. Then, the terminal determines the uplink transmission power in accordance with at least one of the power control parameter or the path loss reference signal, and transmits the uplink signal in accordance with the uplink transmission power. As a result, it is able to configure the uplink transmission power corresponding to the power control parameter in accordance with the QCL relationship, and transmit the uplink signal in accordance with the uplink transmission power, thereby to improve uplink transmission performance.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
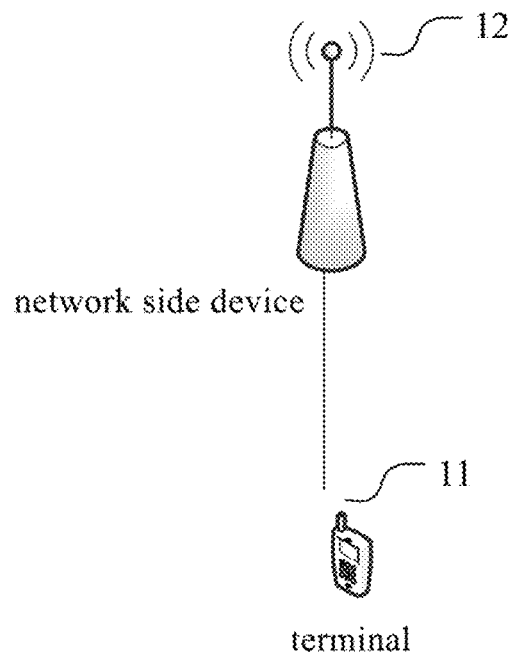
FIG. 1 is a schematic view of an available network according to one embodiment of the present disclosure.

FIG. 1 shows an available network according to one embodiment of the present disclosure. As shown in FIG. 1, the network includes a terminal 11 and a network side device 12. The terminal 11 may be a User Equipment (UE) or any other terminal device, e.g., mobile phone, tablet personal computer, laptop computer, Personal Digital Assistant (PDA), Mobile Internet Device (MID), wearable device, robot or vehicle. It should be appreciated that, a specific type of the terminal will not be particularly defined herein. The network side device 12 may be a base station, e.g., a macro base station, a Long Term Evolution (LTE) evolved Node B (eNB) or a 5G New Radio (NR) NB, a micro base station, e.g., a Low Power Node (LPN), a pico base station or a femto base station), an Access Point (AP), or a network node, e.g., a Central Unit (CU) or a Transmission Reception Point (TRP). It should be appreciated that, a specific type of the network side device will not be particularly defined herein.

Figure 2:
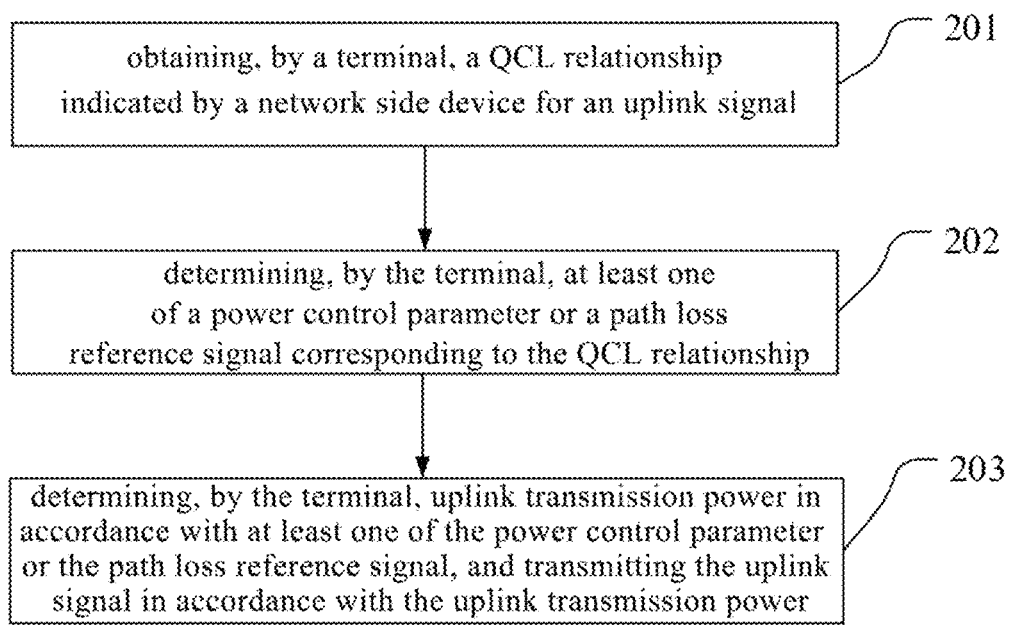
FIG. 2 is a flow chart of a power control parameter configuration method according to one embodiment of the present disclosure.

As shown in FIG. 2, the present disclosure provides in some embodiments a power control parameter configuration method which includes: Step 201 of obtaining, by a terminal, a QCL relationship indicated by a network side device for an uplink signal; Step 202 of determining, by the terminal, at least one of a power control parameter or a path loss reference signal corresponding to the QCL relationship, the power control parameter being associated with large-scale information for the QCL relationship, the path loss reference signal being associated with a reference signal in the QCL relationship; and Step 203 of determining uplink transmission power in accordance with at least one of the power control parameter or the path loss reference signal, and transmitting the uplink signal in accordance with the uplink transmission power.

In some embodiments of the present disclosure, a Transmission Configuration Indication (TCI) state may be used to configure the QCL relationship, or the QCL relationship may be configured through the TCI state. Hence, in some embodiments of the present disclosure, the QCL relationship may also be called as or understood as the TCI state or a QCL state.

In addition, the obtaining the QCL relationship may include receiving the QCL relationship configured by the network side device, e.g., configured through configuration information.

The QCL relationship for the uplink signal may be a QCL relationship when the uplink signal is transmitted.

The determining the power control parameter and the path loss reference signal corresponding to the QCL relationship may include determining the power control parameter and the path loss reference signal in accordance with an indication from the network side device. For example, the network side device may indicate power control information such as an identifier of a power control parameter or the power control parameter, so that the terminal may determine the power control parameter and the path loss reference signal in accordance with the power control information. Of course, in some embodiments of the present disclosure, the power control parameter and the path loss reference signal are not limited to be indicated by the network side device. For example, in some embodiments of the present disclosure, multiple power control parameters and path loss reference signals corresponding to QCL relationships are stored in the terminal, and after obtaining a QCL relationship, the terminal may determine the corresponding power control parameter and the corresponding path loss reference signal.

It should be appreciated that, the at least one of the power control parameter or the path loss reference signal in Step 202 may be the same as the at least one of the power control parameter or the path loss reference signal. In other words, when the power control parameter and the path loss reference signal are determined in Step 202, the uplink transmission power is determined in Step 203 in accordance with the power control parameter and the path loss reference signal, and when the power control parameter or the path loss reference signal is determined in Step 202, the uplink transmission power is determined in Step 203 in accordance with the power control parameter or the path loss reference signal. In addition, when the power control parameter is determined in Step 202, the path loss reference signal for determining the uplink transmission power may be that known in a protocol. Identically, when the path loss reference signal is determined in Step 202, the power control parameter for determining the uplink transmission power may be that known in the protocol. As a result, in comparison with the related arts, the above method in accordance with some embodiments of the present disclosure can improve uplink transmission performance as well.

It should be appreciated that, when the power control parameter is associated with the large-scale information for the QCL relationship and the path loss reference signal is associated with the reference signal in the QCL relationship, the power control parameter is determined in accordance with the large-scale information for the QCL relationship, and the path loss reference signal is determined in accordance with the reference signal in the QCL relationship. For example, the network side device may determine the path loss reference signal in accordance with the reference signal in the QCL relationship, and determine the power control parameter in accordance with the large-scale information for the QCL relationship.

The large-scale information may include, but not limited to, at least one of path loss, delay spread, average delay, Doppler spread, Doppler offset, average gain or space reception parameter.

To be specific, the large-scale information may be large-scale information already defined or newly defined in the protocol.

During the implementation, the path loss reference signal is associated with the reference signal in the QCL relationship, so it is able to control the power in accordance with a channel state indicated by the reference signal of each QCL relationship, thereby to perform the uplink transmission in a better manner. In addition, the power control parameter is associated with the large-scale information for the QCL relationship, so it is able to control the power in accordance with the large-scale information of each QCL relationship, thereby to perform the uplink transmission in a better manner.

The path loss reference signal may be a reference signal for calculating a path loss, and the path loss and the power control parameter may be parameters in an uplink power control formula. In other words, in some embodiments of the present disclosure, the power control parameter and the path loss reference signal are a part of, or all of, parameters for calculating the uplink transmission power.

It should be appreciated that, in some embodiments of the present disclosure, the uplink transmission power is not limited to be determined in accordance with at least one of the power control parameter or the path loss reference signal. For example, the uplink transmission power may be determined through a power control formula already defined in the protocol or a power control formula newly defined in a subsequent protocol release, which will not be particularly defined herein. In addition, the uplink power control formula may be at least one of power control formulae for a PUSCH, a PUCCH, or an SRS.

In some embodiments of the present disclosure, through the above steps, it is able to configure the corresponding power control parameter and the corresponding path loss reference signal for the QCL relationship, and control the power in accordance with the power control parameter and the path loss reference signal in accordance with each QCL relationship, thereby to perform the uplink transmission in a better manner and improve the uplink transmission performance. For example, during the uplink transmission for the QCL relationship, a corresponding power control parameter is used, e.g., the uplink signal is transmitted using the above-mentioned power control parameter.

As an instance, the network side device determines that the corresponding power control parameter is to be configured for the QCL relationship in accordance with channel information about the QCL relationship, and indicates the QCL relationship for the uplink signal to the terminal. The terminal determines the power control parameter corresponding to the QCL relationship, and transmits the corresponding uplink signal.

In some possible embodiments of the present disclosure, in the case that the reference signal in the QCL relationship is a downlink reference signal, the path loss reference signal is the downlink reference signal, or in the case that the reference signal in the QCL relationship is an uplink reference signal, the path loss reference signal is a QCL downlink reference signal for the uplink reference signal.

For example, one reference signal may be configured for each QCL relationship, and the reference signal may be a downlink reference signal or an uplink reference signal. When the reference signal in the QCL relationship is a downlink reference signal, the path loss reference signal is just the downlink reference signal, without configuring any additional path loss reference signal. When the reference signal in the QCL relationship is an uplink reference signal (e.g., SRS), the network side device may configure the path loss reference signal as a QCL downlink reference signal of the uplink reference signal.

The QCL downlink reference signal of the uplink reference signal may be understood as a downlink reference signal having a QCL relationship with the uplink reference signal.

During the implementation, through this configuration, it is able for a path loss estimate to best match an actual channel state when a signal is transmitted, thereby to control the power in a more accurate manner.

In some possible embodiments of the present disclosure, the power control parameter includes at least one of a path loss compensation factor or a target received power.

Here, the path loss compensation factor and the target received power may be a path loss compensation factor and a target received power in an uplink power control formula.

The path loss compensation factor and the target received power are power control parameters related to the QCL relationship. In this way, merely the power control parameter related to the QCL relationship is configured, so as to reduce complexity.

In some possible embodiments of the present disclosure, in the case that a path loss of the large-scale information is a first path loss, the path loss compensation factor is a first path loss compensation factor and the target received power is first target received power, or the path loss compensation factor is a second path loss compensation factor and the target received power is second target received power; and in the case that fading of the large-scale information is a second path loss, the path loss compensation factor is a third path loss compensation factor and the target received power is third target received power. The first path loss is greater than the second path loss, the first path loss compensation factor is greater than the third path loss compensation factor, the first target received power is greater than the third target received power, the second path loss compensation factor is smaller than the third path loss compensation factor, and the second target received power is smaller than the third target received power.

During the implementation, each QCL relationship may correspond to the path loss of one piece of large-scale information. In addition, the path loss of the large-scale information may also be understood as large-scale fading of the large-scale information.

During the implementation, the first path loss is greater than the second path loss, the first path loss compensation factor is greater than the third path loss compensation factor, and the first target received power is greater than the third target received power. When the path loss is relatively large, the terminal is located at an edge of a network, i.e., it is an edge user. At this time, through providing the large path loss compensation factor and the large target received power, it is able to improve uplink transmission quality of the edge user. When the path loss is relatively small, the terminal is located in the middle of the network, i.e., it is a central user. At this time, through reducing the path loss compensation factor and the target received power, it is able to reduce the power consumption of the terminal.

In addition, the second path loss compensation factor and the second target received power are set in such a manner that the second path loss compensation factor is smaller than the third path loss compensation factor and the second target received power is smaller than the third target received power. In this way, it is able to reduce an interference in the entire network, and reduce the path loss compensation factor and the target received power for the edge user. To be specific, the path loss compensation factor and the target received power may be adjusted by the network side device according to the practical need.

During the implementation, the appropriate power control parameter may be configured for the QCL relationship, so as to improve the system performance.

In some possible embodiments of the present disclosure, the power control parameter is a power control parameter carried in configuration information for the QCL relationship; or the power control parameter is a power control parameter obtained through performing a first operation on the power control parameter in the configuration information for the QCL relationship and a power control parameter stored in the terminal.

The configuration information may be understood as configuration information for configuring the QCL relationship, e.g., high-layer signaling, such as RRC signaling.

The first operation may be a summation operation. Of course, the first operation is not limited thereto. For example, in some embodiments of the present disclosure, the first operation may be a subtraction operation or any other operation.

The power control parameter may include one or more power control parameters indicating at least one of a PUCCH, a PUSCH or an SRS, and the power control parameters indicating at least one of the PUCCH, the PUSCH or the SRS in the configuration information are configured independently or in a jointly manner.

For example, when the QCL relationship is configured through RRC, the power control parameter corresponding to the QCL relationship is simultaneously configured in the QCL relationship, e.g., the power control parameter corresponding to the large-scale information for the QCL relationship. To be specific, through activating the QCL relationship by an MAC CE and indicating the QCL relationship through the DCL, the terminal may obtain the QCL relationship and the corresponding power control parameter for the uplink transmission.

When the first operation is a summation operation, P0 of the SRS is added to a P0 value stored in the terminal each time an indication indicating the QCL relationship has been received (e.g., the QCL relationship indicated through TCI) to obtain an updated P0 value. For the PUCCH and the PUSCH, a P0 value in the QCL relationship is added to a configured normal path loss compensation factor (P0-normal) each time an indication indicating the QCL relationship has been received (e.g., the QCL relationship indicated through TCI) to obtain P0 in the power control formula. P0 represents the target received power.

When the power control parameters indicating at least one of the PUCCH, the PUSCH or the SRS are configured independently, the power control parameters indicating the PUCCH, the PUSCH and the SRS are configured separately, e.g., PathlossReferenceRS-Id is PUSCH-PathlossReferenceRS-Id, PathlossReferenceRS-Id is PUCCH-PathlossReferenceRS-Id, and P0-AlphaSetId is P0-PUSCH-AlphaSetId, where PathlossReferenceRS represents the path loss reference signal.

When the power control parameters indicating at least one of the PUCCH, the PUSCH or the SRS are configured in a jointly manner, a plurality of joint path loss reference signals (PathlossReferenceRS) and path loss compensation factors (P0-AlphaSet) is configured for the terminal without distinguishing among the PUCCH, the PUSCH and the SRS, as defined as follows:

```
UL-PowerControl ::=                    SEQUENCE {
    p0-AlphaSets                           SEQUENCE (SIZE
(1..maxNrofP0-AlphaSets)) OF P0-AlphaSet
    pathlossReferenceRSToAddModList        SEQUENCE (SIZE
(1..maxNrofPathlossReferenceRSs)) OF PathlossReferenceRS
    pathlossReferenceRSToReleaseList       SEQUENCE (SIZE
(1..maxNrofPathlossReferenceRSs)) OF PathlossReferenceRS-Id
}
P0-AlphaSet ::=                        SEQUENCE {
    p0 -AlphaSetId                         P0-AlphaSetId,
    p0                                     INTEGER (-16..15)
    alpha                                  Alpha
}
PathlossReferenceRS ::=                SEQUENCE {
    pathlossReferenceRS-Id                 PathlossReferenceRS-Id,
    referenceSignal                        CHOICE {
        ssb-Index                              SSB-Index,
        csi-RS-Index                           NZP-CSI-RS-ResourceId
    }
}.
```

In addition, the power control information is configured in an uplink TCI state as follows. One QCL relationship and a power control parameter corresponding to the QCL relationship are configured in each uplink TCI state as follows.

```
UL-TCI-State ::=                       SEQUENCE {
    tci-StateId                            TCI-StateId,
    cell                                   ServCellIndex
    bwp-Id                                 BWP-Id
    referenceSignal                        CHOICE {
        csi-rs                                 NZP-CSI-RS-ResourceId,
        ssb                                    SSB-Index
        SRS                                    SRS-ResourceId
    },
    qcl-Type                               ENUMERATED {typeA,
typeB, typeC, typeD},
    pathlossReferenceRS-Id                 PathlossReferenceRS-Id,
    p0-AlphaSetId                          P0-AlphaSetId,
    closedLoopIndex                        ENUMERATED { i0, i1 }.
```

When the reference signal is a downlink reference signal, PathlossReferenceRS-Id may not be configured.

Alternatively, power-related information is directly configured in the uplink TCI state as follows. One QCL relationship and a power control parameter corresponding to the QCL relationship are configured in each uplink TCI state as follows.

```
UL- TCI-State ::=                      SEQUENCE {
    tci-StateId                            TCI-StateId,
    cell                                   ServCellIndex
    bwp-Id                                 BWP-Id
    referenceSignal                        CHOICE {
        csi-rs                                 NZP-CSI-RS-ResourceId,
        ssb                                    SSB-Index
        SRS                                    SRS-ResourceId
    },
    qcl-Type                               ENUMERATED {typeA,
typeB, typeC, typeD},
    pathlossReferenceRS                    CHOICE {
        ssb-Index                              SSB-Index,
        csi-RS-Index                           NZP-CSI-RS-ResourceId
    }
    p0                                     INTEGER (-16..15)
    alpha                                  Alpha
    closedLoopIndex                        ENUMERATED { i0, i1 }.
```

When the reference signal is a downlink reference signal, PathlossReferenceRS may not be configured.

During the implementation, the power control parameters indicating at least one of the PUCCH, the PUSCH or the SRS are configured in a jointly manner, so as to reduce signaling overhead.

It should be appreciated that, in some embodiments of the present disclosure, when the reference signal in the QCL relationship is a downlink reference signal (e.g., Synchronization Signal Block (SSB) or Channel State Information-Reference Signal (CSI-RS)), the path loss reference signal may not be configured, and the downlink reference signal may be taken as the path loss reference signal.

In some possible embodiments of the present disclosure, the power control parameter is one or more power control parameters in multiple power control parameters corresponding to one or more identifiers, the one or more identifiers include an identifier configured through the configuration information for the QCL relationship, and the multiple power control parameters are configured in advance.

The multiple power control parameters may be power control parameters for the uplink transmission through a plurality of QCL relationships. In this way, it is able to flexibly indicate the power control parameter corresponding to each QCL relationship through the identifier.

For example, for the power control information, a plurality of P0-AlphaSets and a plurality of PathlossReferencERSs have been configured in advance. The network side device may configure a corresponding P0-Alpha ID and a corresponding PathlossReferenceRS ID in a QCL state in accordance with the large-scale information for the QCL relationship.

For example, P0-AlphaSet may be configured as follows. For the PUSCH,

```
P0-PUSCH-AlphaSet ::=                  SEQUENCE {
    p0-PUSCH-AlphaSetId                    P0-PUSCH-AlphaSetId,
    p0                                     INTEGER (-16..15)
    alpha                                  Alpha
}.
```

A value of Alpha may be 0, 0.4, 0.5, 0.6, 0.7, 0.8, 0.9 or 1.0. For the PUCCH, no Alpha may be included in the power control formula,

```
P0-PUCCH ::=        SEQUENCE {
    p0-PUCCH-Id         P0-PUCCH-Id,
    p0-PUCCH-Value      INTEGER (-16..15)
}.
```

For the SRS,

```
    alpha       Alpha
    p0          INTEGER (-202..24).
```

It follows that, P0 has a same range for the PUSCH and the PUCCH, i.e., P0 has a relative value, while P0 is an absolute value for the SRS. In this way, P0 associated with the QCL relationship may be configured as a relative value, so as to provide a unified configuration process for the uplink PUSCH, PUCCH and SRS. For example, as mentioned hereinabove, the power control parameters indicating at least one of the PUCCH, the PUSCH or the SRS may be power control parameters configured in a jointly manner.

In addition, multiple QCL power control parameters (e.g., QCL-PowerControl) may be configured through RRC, and one QCL power control parameter ID may be configured for each QCL relationship.

For example, in one instance of QCL-PowerControl, PathlossReferenceRS-Id and P0-PAlphaSetId may refer to the description mentioned hereinabove:

```
QCL-PowerControl ::=            SEQUENCE {
    qcl-PowerControlId              QCL-PowerControlId,
    qcl-PathlossReferenceRS-Id      PathlossReferenceRS-Id,
    qcl-P0-AlphaSetId               P0-PAlphaSetId,
    qcl-ClosedLoopIndex             ENUMERATED { i0, i1 }
}.
```

For another example, in another instance of QCL-PowerControl,

```
QCL-PowerControl ::=        SEQUENCE {
    qcl-PowerControlId          QCL-PowerControlId,
    referenceSignal             CHOICE {
        ssb-Index                   SSB-Index,
        csi-RS-Index                NZP-CSI-RS-ResourceId
    }
    p0                          INTEGER (-16..15)
    alpha                       Alpha
    qcl-ClosedLoopIndex         ENUMERATED { i0, i1 }
}.
```

Next, when configuring the QCL relationship, one QCL power control parameter may be configured for the QCL relationship. For example, in a following possible instance, one QCL relationship and a power control parameter corresponding to the QCL relationship may be configured in each uplink TCL state:

```
UL-TCI-State ::=        SEQUENCE {
    tci-StateId             TCI-StateId,
    cell                    ServCellIndex
    bwp-Id                  BWP-Id
    referenceSignal         CHOICE {
        csi-rs                  NZP-CSI-RS-ResourceId,
```

-continued

```
        ssb                     SSB-Index
        SRS                     SRS-ResourceId
    },
    qcl-Type                ENUMERATED {typeA,
typeB, typeC, typeD},
    qcl-PowerControl        QCL-PowerControl-Id.
```

In some possible embodiments of the present disclosure, the power control parameter includes one or more power control parameters indicating at least one of a PUCCH, a PUSCH or an SRS, one or more identifiers of the one or more power control parameters for PUSCH are one or more identifiers configured through the configuration information, one or more identifiers of the one or more power control parameters for SRS are one or more identifiers configured through the configuration information or one or more identifiers configured in an SRS request, and one or more identifiers of the one or more power control parameters for PUCCH are one or more identifiers configured through the configuration information, RRC or an MAC CE.

During the implementation, the power control parameters indicating the PUCCH, the PUSCH and the SRS may be configured flexibly. For example, the uplink TCI state (e.g., UL-TCI state) may be used to configure an uplink QCL relationship (e.g., UL QCL state), and configure the power control parameters of the PUSCH, the SRS and the PUCCH. For the PUSCH, the TCI state may be indicated through a UL TCI field in the DCI. For the SRS, the TCI state may be indicated through an additional SRS TCI field in the DCI together with an SRS request for indicating the transmission of the SRS, or indicated in an SRS configuration of the RRC. For the PUCCH, the TCI state may be configured through the TCI, or through the RRC or the MAC CE.

In some possible embodiments of the present disclosure, the power control parameter is one or more power control parameters from a power control parameter set indicated by DCI, the power control parameter is one or more power control parameters from a power control parameter set indicated by DCI, the power control parameter is one or more power control parameters from a power control parameter set indicated by DCI, the power control parameter is one or more power control parameters from a power control parameter set indicated by DCI, and the power control parameter set is configured for the QCL relationship in advance.

During the implementation, one power control parameter set maybe configured for each QCL relationship, and the power control parameter set may include one or more groups of power control parameters. The quantities of the power control parameters and the contents thereof in the power control parameter sets for different QCL relationships may be identical, or partially identical, or different. In this way, it is able to flexibly configure the power control parameter for each QCL relationship. In addition, because one power control parameter set is configured for each QCL relationship, it is able to configure the power control parameter matching each QCL relationship in a better manner, thereby to further improve the uplink transmission performance.

For example, the network side device may configure and activate a plurality of QCL relationships for the terminal, and activate a corresponding power control parameter set for each QCL relationship. In other words, N QCL-PowerControls are configured and updated in RRC IE PUSCH-PowerControl, where a value of N depends on the quantity of bits indicated by the QCL relationship in the DCI. For example, when the quantity of bits indicated by the QCL relationship is 3, N is smaller than or equal to 8.

To be specific,

```
PUSCH-PowerControl ::=                SEQUENCE {
    o o o o o
    qcl-PowerControl-MappingToAddModList     SEQUENCE (SIZE
(1..maxNrofSRI-PUSCH-Mappings)) OF QCL-PowerControl
    qcl-PowerControl-MappingToReleaseList    SEQUENCE (SIZE
(1..maxNrofSRI-PUSCH-Mappings)) OF Q-PowerControl-Id
}.
```

Then, a certain QCL-PowerCOntrol configured in PUSCH-PowerControl may be indicated through the QCL relationship in the DCI.

For another example, any two of the QCL relationship, the path loss reference signal and the power control parameter may be configured in a combined manner. When the reference signal in the QCL relationship is a downlink signal, the reference signal may serve as the path loss reference signal simultaneously. An open-loop power control parameter P0AlphaSet-Id (at most having 5 bits) and a closed-loop adjustment state (e.g., 1 bit) may be configured for the QCL relationship through the DCI. The closed-loop adjustment state is a closed-loop parameter in the uplink power control formula.

Further, the network side device may decide whether to update the power control parameter. When the DCI includes the power control parameter, the terminal needs to update the power control parameter, without any additional indication for indicating the updating of the power control parameter. For example, for P0AlphaSet-Id, when it is not configured in the DCI, the terminal may use a configured P0AlphaSet-Id, e.g.,

```
UL-TCI-State ::=         SEQUENCE {
    tci-StateId              TCI-StateId,
    cell                        ServCellIndex
    bwp-Id                   BWP-Id
    referenceSignal          CHOICE {
        csi-rs                   NZP-CSI-RS-ResourceId,
        ssb                      SSB-Index
    },
},
    qcl-Type                 ENUMERATED {typeA,
typeB, typeC, typeD}.
```

In some embodiments of the present disclosure, when configuring the uplink QCL relationship, it is able to configure the corresponding power control parameter for the QCL relationship.

For example, the network side device may configure the power control parameter for the QCL relationship through high-layer signaling or physical layer signaling DCI.

According to the embodiments of the present disclosure, the corresponding power control parameter is configured for the QCL relationship when configuring the uplink QCL relationship, so it is able to control the power in accordance with the power control parameter for each QCL relationship, thereby to perform the uplink transmission in a better manner.

Figure 3:
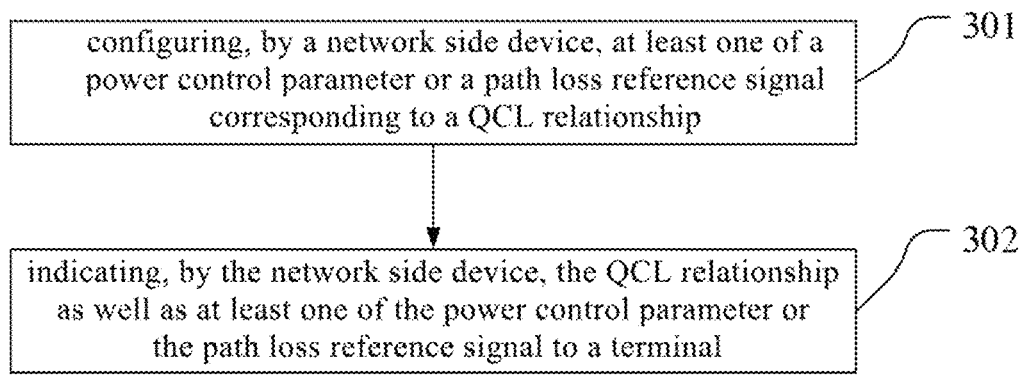
FIG. 3 is another flow chart of the power control parameter configuration method according to one embodiment of the present disclosure.

As shown in FIG. 3, the present disclosure further provides in some embodiments a power control parameter configuration method, which includes: Step 301 of configuring, by a network side device, at least one of a power control parameter or a path loss reference signal corresponding to a QCL relationship, the power control parameter being determined in accordance with large-scale information for the QCL relationship, the path loss reference signal being determined in accordance with a reference signal in the QCL relationship; and Step 302 of indicating, by the network side device, the QCL relationship as well as at least one of the power control parameter or the path loss reference signal to a terminal.

In some possible embodiments of the present disclosure, the power control parameter includes at least one of a path loss compensation factor or a target received power.

In some possible embodiments of the present disclosure, in the case that the reference signal in the QCL relationship is a downlink reference signal, the path loss reference signal is the downlink reference signal, or in the case that the reference signal in the QCL relationship is an uplink reference signal, the path loss reference signal is a QCL downlink reference signal for the uplink reference signal.

In some possible embodiments of the present disclosure, in the case that a path loss of the large-scale information is a first path loss, the path loss compensation factor is a first path loss compensation factor and the target received power is first target received power, or the path loss compensation factor is a second path loss compensation factor and the target received power is second target received power; and in the case that fading of the large-scale information is a second path loss, the path loss compensation factor is a third path loss compensation factor and the target received power is third target received power. The first path loss is greater than the second path loss, the first path loss compensation factor is greater than the third path loss compensation factor, the first target received power is greater than the third target received power, the second path loss compensation factor is smaller than the third path loss compensation factor, and the second target received power is smaller than the third target received power.

In some possible embodiments of the present disclosure, the power control parameter is indicated by the network side device through configuration information for the QCL relationship; or the power control parameter is a power control parameter obtained through performing a first operation on the power control parameter in the configuration information for the QCL relationship and a power control parameter stored in the terminal.

In some possible embodiments of the present disclosure, the power control parameter includes one or more power control parameters indicating at least one of a PUCCH, a PUSCH or an SRS, and the power control parameters indicating at least one of the PUCCH, the PUSCH or the SRS in the configuration information are configured independently or in a jointly manner.

In some possible embodiments of the present disclosure, the power control parameter is indicated by the network side device in multiple power control parameters through an identifier, the identifier includes an identifier configured through the configuration information for the QCL relationship, and the multiple power control parameters are configured in advance; or the power control parameter is indicated by the network side device in a power control parameter set through DCI, and the power control parameter set is configured for the QCL relationship in advance.

In some possible embodiments of the present disclosure, the power control parameter includes one or more power control parameters indicating at least one of a PUCCH, a PUSCH or an SRS, one or more identifiers of the one or more power control parameters for PUSCH are one or more identifiers configured through the configuration information, one or more identifiers of the one or more power control parameters for SRS are one or more identifiers configured through the configuration information or one or more identifiers configured in an SRS request, and one or more identifiers of the one or more power control parameters for PUCCH are one or more identifiers configured through the configuration information, RRC or an MAC CE.

It should be appreciated that, the implementation of the method may refer to the relevant description about the network side device in the embodiments as shown in FIG. 2 with a same beneficial effect, which will not be particularly defined herein.

Figure 4:
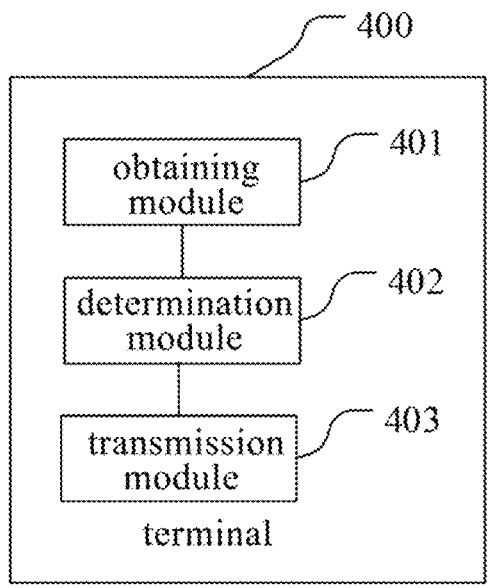
FIG. 4 is a schematic view of a terminal according to one embodiment of the present disclosure.

As shown in FIG. 4, the present disclosure further provides in some embodiments a terminal 400, which includes: an obtaining module 401 configured to obtain a QCL relationship indicated by a network side device for an uplink signal; a determination module 402 configured to determine at least one of a power control parameter or a path loss reference signal corresponding to the QCL relationship, the power control parameter being associated with large-scale information for the QCL relationship, the path loss reference signal being associated with a reference signal in the QCL relationship; and a transmission module 403 configured to determine uplink transmission power in accordance with at least one of the power control parameter or the path loss reference signal, and transmit the uplink signal in accordance with the uplink transmission power.

In some possible embodiments of the present disclosure, the power control parameter includes at least one of a path loss compensation factor or a target received power.

In some possible embodiments of the present disclosure, in the case that the reference signal in the QCL relationship is a downlink reference signal, the path loss reference signal is the downlink reference signal, or in the case that the reference signal in the QCL relationship is an uplink reference signal, the path loss reference signal is a QCL downlink reference signal for the uplink reference signal.

In some possible embodiments of the present disclosure, in the case that a path loss of the large-scale information is a first path loss, the path loss compensation factor is a first path loss compensation factor and the target received power is first target received power, or the path loss compensation factor is a second path loss compensation factor and the target received power is second target received power; and in the case that fading of the large-scale information is a second path loss, the path loss compensation factor is a third path loss compensation factor and the target received power is third target received power. The first path loss is greater than the second path loss, the first path loss compensation factor is greater than the third path loss compensation factor, the first target received power is greater than the third target received power, the second path loss compensation factor is smaller than the third path loss compensation factor, and the second target received power is smaller than the third target received power.

In some possible embodiments of the present disclosure, the power control parameter is a power control parameter carried in configuration information for the QCL relationship; or the power control parameter is a power control parameter obtained through performing a first operation on the power control parameter in the configuration information for the QCL relationship and a power control parameter stored in the terminal.

In some possible embodiments of the present disclosure, the power control parameter includes one or more power control parameters indicating at least one of a PUCCH, a PUSCH or an SRS, and the power control parameters indicating at least one of the PUCCH, the PUSCH or the SRS in the configuration information are configured independently or in a jointly manner.

In some possible embodiments of the present disclosure, the power control parameter is one or more power control parameters in multiple power control parameters corresponding to one or more identifiers, the identifier includes an identifier configured through the configuration information for the QCL relationship, and the multiple power control parameters are configured in advance; or the power control parameter is one or more power control parameters from a power control parameter set indicated by DCI, the power control parameter is one or more power control parameters from a power control parameter set indicated by DCI, the power control parameter is one or more power control parameters from a power control parameter set indicated by DCI, the power control parameter is one or more power control parameters from a power control parameter set indicated by DCI, and the power control parameter set is configured for the QCL relationship in advance.

In some possible embodiments of the present disclosure, the power control parameter includes one or more power control parameters indicating at least one of a PUCCH, a PUSCH or an SRS, one or more identifiers of the one or more power control parameters for PUSCH are one or more identifiers configured through the configuration information, one or more identifiers of the one or more power control parameters for SRS are one or more identifiers configured through the configuration information or one or more identifiers configured in an SRS request, and one or more identifiers of the one or more power control parameters for PUCCH are one or more identifiers configured through the configuration information, RRC or an MAC CE.

It should be appreciated that, the terminal 400 may be a terminal in the above-mentioned method embodiments, and the implementation of the terminal 400 may refer to that of the terminal in the above-mentioned method embodiments with a same beneficial effect, which will not be particularly defined herein.

Figure 5:
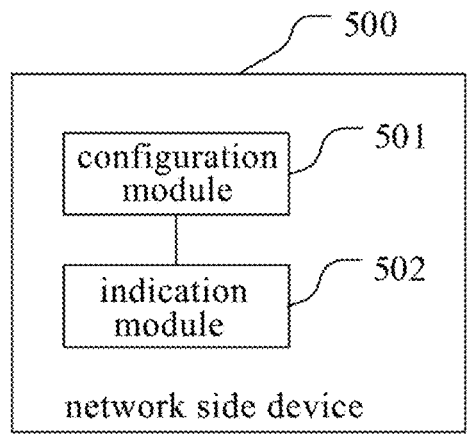
FIG. 5 is a schematic view of a network side device according to one embodiment of the present disclosure.

As shown in FIG. 5, the present disclosure provides in some embodiments a network side device 500 which includes: a configuration module 501 configured to configure at least one of a power control parameter or a path loss reference signal corresponding to a QCL relationship, the power control parameter being determined in accordance with large-scale information for the QCL relationship, the path loss reference signal being determined in accordance with a reference signal in the QCL relationship; and an indication module 502 configured to indicate the QCL relationship as well as at least one of the power control parameter or the path loss reference signal to a terminal.

In some possible embodiments of the present disclosure, the power control parameter includes at least one of a path loss compensation factor or a target received power.

In some possible embodiments of the present disclosure, in the case that the reference signal in the QCL relationship is a downlink reference signal, the path loss reference signal is the downlink reference signal, or in the case that the reference signal in the QCL relationship is an uplink reference signal, the path loss reference signal is a QCL downlink reference signal for the uplink reference signal.

In some possible embodiments of the present disclosure, in the case that a path loss of the large-scale information is a first path loss, the path loss compensation factor is a first path loss compensation factor and the target received power is first target received power, or the path loss compensation factor is a second path loss compensation factor and the target received power is second target received power; and in the case that fading of the large-scale information is a second path loss, the path loss compensation factor is a third path loss compensation factor and the target received power is third target received power. The first path loss is greater than the second path loss, the first path loss compensation factor is greater than the third path loss compensation factor, the first target received power is greater than the third target received power, the second path loss compensation factor is smaller than the third path loss compensation factor, and the second target received power is smaller than the third target received power.

In some possible embodiments of the present disclosure, the power control parameter is indicated by the network side device through configuration information for the QCL relationship; or the power control parameter is a power control parameter obtained through performing a first operation on the power control parameter in the configuration information for the QCL relationship and a power control parameter stored in the terminal.

In some possible embodiments of the present disclosure, the power control parameter includes one or more power control parameters indicating at least one of a PUCCH, a PUSCH or an SRS, and the power control parameters indicating at least one of the PUCCH, the PUSCH or the SRS in the configuration information are configured independently or in a jointly manner.

In some possible embodiments of the present disclosure, the power control parameter is indicated by the network side device in multiple power control parameters through an identifier, the identifier includes an identifier configured through the configuration information for the QCL relationship, and the multiple power control parameters are configured in advance; or the power control parameter is indicated by the network side device in a power control parameter set through DCI, and the power control parameter set is configured for the QCL relationship in advance.

In some possible embodiments of the present disclosure, the power control parameter includes one or more power control parameters indicating at least one of a PUCCH, a PUSCH or an SRS, one or more identifiers of the one or more power control parameters for PUSCH are one or more identifiers configured through the configuration information, one or more identifiers of the one or more power control parameters for SRS are one or more identifiers configured through the configuration information or one or more identifiers configured in an SRS request, and one or more identifiers of the one or more power control parameters for PUCCH are one or more identifiers configured through the configuration information, RRC or an MAC CE.

It should be appreciated that, the network side device 500 may be a network side device in the above-mentioned method embodiments, and the implementation of the network side device 500 may refer to that of the network side device in the above-mentioned method embodiments with a same beneficial effect, which will not be particularly defined herein.

Figure 6:
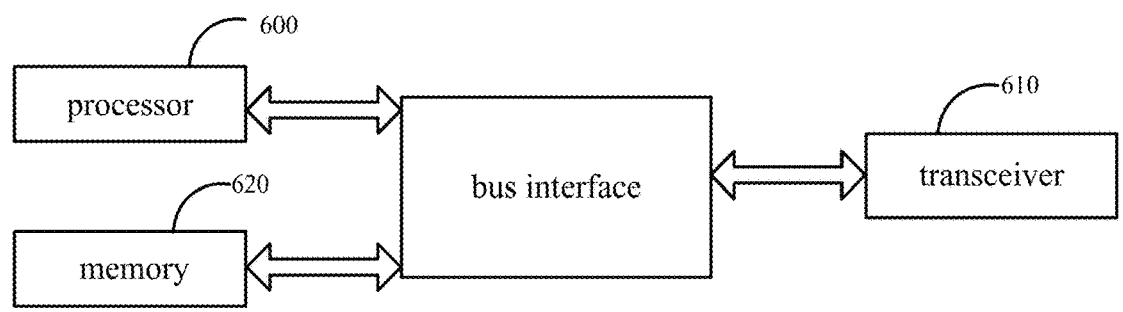
FIG. 6 is another schematic view of the terminal according to one embodiment of the present disclosure.

As shown in FIG. 6, the present disclosure further provides in some embodiments a terminal, which includes a transceiver 610, a memory 620, a processor 600, and a program stored in the memory 620 and executed by the processor 600. The transceiver 610 is configured to obtain a QCL relationship indicated by a network side device for an uplink signal. The transceiver 610 or the processor 600 is configured to determine at least one of a power control parameter or a path loss reference signal corresponding to the QCL relationship, the power control parameter is associated with large-scale information for the QCL relationship, and the path loss reference signal is associated with a reference signal in the QCL relationship. The transceiver 610 is further configured to determine uplink transmission power in accordance with at least one of the power control parameter or the path loss reference signal, and transmit the uplink signal in accordance with the uplink transmission power.

The transceiver 610 is configured to receive and transmit data under the control of the processor 600.

In FIG. 6, bus architecture may include a number of buses and bridges connected to each other, so as to connect various circuits for one or more processors 600 and one or more memories 620. In addition, as is known in the art, the bus architecture may be used to connect any other circuits, such as a circuit for a peripheral device, a circuit for a voltage stabilizer and a power management circuit. A bus interface may be provided, and the transceiver 610 may consist of a plurality of elements, i.e., a transmitter and a receiver for communication with any other devices over a transmission medium.

The processor 600 may take charge of managing the bus architecture as well as general processings. The memory 620 may store therein data for the operation of the processor 600.

It should be appreciated that, the memory 620 is not limited to be merely located on the terminal, and the memory 620 and the processor 600 may be located at different geographical positions.

In some possible embodiments of the present disclosure, the power control parameter includes at least one of a path loss compensation factor or a target received power.

In some possible embodiments of the present disclosure, in the case that the reference signal in the QCL relationship is a downlink reference signal, the path loss reference signal is the downlink reference signal, or in the case that the reference signal in the QCL relationship is an uplink reference signal, the path loss reference signal is a QCL downlink reference signal for the uplink reference signal.

In some possible embodiments of the present disclosure, in the case that a path loss of the large-scale information is a first path loss, the path loss compensation factor is a first path loss compensation factor and the target received power is first target received power, or the path loss compensation factor is a second path loss compensation factor and the target received power is second target received power; and in the case that fading of the large-scale information is a second path loss, the path loss compensation factor is a third path loss compensation factor and the target received power is third target received power. The first path loss is greater than the second path loss, the first path loss compensation factor is greater than the third path loss compensation factor, the first target received power is greater than the third target received power, the second path loss compensation factor is smaller than the third path loss compensation factor, and the second target received power is smaller than the third target received power.

In some possible embodiments of the present disclosure, the power control parameter is a power control parameter carried in configuration information for the QCL relationship; or the power control parameter is a power control parameter obtained through performing a first operation on the power control parameter in the configuration information for the QCL relationship and a power control parameter stored in the terminal.

In some possible embodiments of the present disclosure, the power control parameter includes one or more power control parameters indicating at least one of a PUCCH, a PUSCH or an SRS, and the power control parameters indicating at least one of the PUCCH, the PUSCH or the SRS in the configuration information are configured independently or in a jointly manner.

In some possible embodiments of the present disclosure, the power control parameter is one or more power control parameters in multiple power control parameters corresponding to one or more identifiers, the identifier includes an identifier configured through the configuration information for the QCL relationship, and the multiple power control parameters are configured in advance; or the power control parameter is one or more power control parameters from a power control parameter set indicated by Downlink Control Information (DCI), and the power control parameter set is configured for the QCL relationship in advance.

In some possible embodiments of the present disclosure, the power control parameter includes one or more power control parameters indicating at least one of a PUCCH, a PUSCH or an SRS, one or more identifiers of the one or more power control parameters for PUSCH are one or more identifiers configured through the configuration information, one or more identifiers of the one or more power control parameters for SRS are one or more identifiers configured through the configuration information or one or more identifiers configured in an SRS request, and one or more identifiers of the one or more power control parameters for PUCCH are one or more identifiers configured through the configuration information, RRC or an MAC CE.

It should be appreciated that, the terminal may be a terminal in the above-mentioned method embodiments, and the implementation of the terminal may refer to that of the terminal in the above-mentioned method embodiments with a same beneficial effect, which will not be particularly defined herein.

Figure 7:
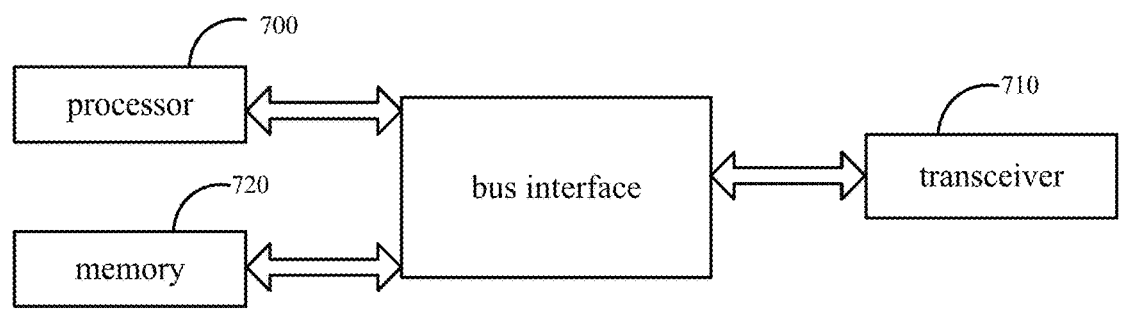
FIG. 7 is another schematic view of the network side device according to one embodiment of the present disclosure.

As shown in FIG. 7, the present disclosure further provides in some embodiments a network side device, which includes a transceiver 710, a memory 720, a processor 700, and a program stored in the memory 720 and executed by the processor. The transceiver 710 or the processor 700 is configured to configure at least one of a power control parameter or a path loss reference signal corresponding to a QCL relationship, the power control parameter is determined in accordance with large-scale information for the QCL relationship, and the path loss reference signal is determined in accordance with a reference signal in the QCL relationship. The transceiver 710 is configured to indicate the QCL relationship as well as at least one of the power control parameter or the path loss reference signal to a terminal.

The transceiver 710 is configured to receive and transmit data under the control of the processor 700.

In FIG. 7, bus architecture may include a number of buses and bridges connected to each other, so as to connect various circuits for one or more processors 700 and one or more memories 720. In addition, as is known in the art, the bus architecture may be used to connect any other circuits, such as a circuit for a peripheral device, a circuit for a voltage stabilizer and a power management circuit. A bus interface may be provided, and the transceiver 710 may consist of a plurality of elements, i.e., a transmitter and a receiver for communication with any other devices over a transmission medium.

The processor 700 may take charge of managing the bus architecture as well as general processings. The memory 720 may store therein data for the operation of the processor 700.

It should be appreciated that, the memory 720 is not limited to be merely located on the network side device, and the memory 720 and the processor 700 may be located at different geographical positions.

In some possible embodiments of the present disclosure, the power control parameter includes at least one of a path loss compensation factor or a target received power.

In some possible embodiments of the present disclosure, in the case that the reference signal in the QCL relationship is a downlink reference signal, the path loss reference signal is the downlink reference signal, or in the case that the reference signal in the QCL relationship is an uplink reference signal, the path loss reference signal is a QCL downlink reference signal for the uplink reference signal.

In some possible embodiments of the present disclosure, in the case that a path loss of the large-scale information is a first path loss, the path loss compensation factor is a first path loss compensation factor and the target received power is first target received power, or the path loss compensation factor is a second path loss compensation factor and the target received power is second target received power; and in the case that fading of the large-scale information is a second path loss, the path loss compensation factor is a third path loss compensation factor and the target received power is third target received power. The first path loss is greater than the second path loss, the first path loss compensation factor is greater than the third path loss compensation factor, the first target received power is greater than the third target received power, the second path loss compensation factor is smaller than the third path loss compensation factor, and the second target received power is smaller than the third target received power.

In some possible embodiments of the present disclosure, the power control parameter is indicated by the network side device through configuration information for the QCL relationship; or the power control parameter is a power control parameter obtained through performing a first operation on the power control parameter in the configuration information for the QCL relationship and a power control parameter stored in the terminal.

In some possible embodiments of the present disclosure, the power control parameter includes one or more power control parameters indicating at least one of a PUCCH, a PUSCH or an SRS, and the power control parameters indicating at least one of the PUCCH, the PUSCH or the SRS in the configuration information are configured independently or in a jointly manner.

In some possible embodiments of the present disclosure, the power control parameter is indicated by the network side device in multiple power control parameters through an identifier, the identifier includes an identifier configured through the configuration information for the QCL relationship, and the multiple power control parameters are configured in advance; or the power control parameter is indicated by the network side device in a power control parameter set through DCI, and the power control parameter set is configured for the QCL relationship in advance.

In some possible embodiments of the present disclosure, the power control parameter includes one or more power control parameters indicating at least one of a PUCCH, a PUSCH or an SRS, one or more identifiers of the one or more power control parameters for PUSCH are one or more identifiers configured through the configuration information, one or more identifiers of the one or more power control parameters for SRS are one or more identifiers configured through the configuration information or one or more identifiers configured in an SRS request, and one or more identifiers of the one or more power control parameters for PUCCH are one or more identifiers configured through the configuration information, RRC or an MAC CE.

It should be appreciated that, the network side device may be a network side device in the above-mentioned method embodiments, and the implementation of the network side device may refer to that of the network side device in the above-mentioned method embodiments with a same beneficial effect, which will not be particularly defined herein.

The present disclosure further provides in some embodiments a computer-readable storage medium storing therein a computer program. The computer program is executed by a processor so as to implement steps in the above-mentioned power control parameter configuration method for the terminal, or steps in the above-mentioned power control parameter configuration method for the network side device.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM.

It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A power control parameter configuration method, comprising:
   obtaining, by a terminal, a Quasi Co-Location (QCL) relationship indicated by a network side device for an uplink signal;
   determining, by the terminal, (i) a power control parameter corresponding to the QCL relationship, or (ii) a power control parameter and a path loss reference signal both corresponding to the QCL relationship; and
   determining, by the terminal, uplink transmission power in accordance with the power control parameter, or, determining, by the terminal, uplink transmission power in accordance with both the power control parameter and the path loss reference signal, and transmitting the uplink signal in accordance with the uplink transmission power,
   wherein the power control parameter comprises at least one of a path loss compensation factor or a target received power,
   wherein the power control parameter is a power control parameter carried in configuration information for the QCL relationship; or the power control parameter is a power control parameter obtained through performing a first operation on the power control parameter in the configuration information for the QCL relationship and a power control parameter stored in the terminal.

2. The power control parameter configuration method according to claim 1, wherein in the case that the reference signal in the QCL relationship is a downlink reference signal, the path loss reference signal is the downlink reference signal, or in the case that the reference signal in the QCL relationship is an uplink reference signal, the path loss reference signal is a QCL downlink reference signal for the uplink reference signal.

3. The power control parameter configuration method according to claim 1,
   wherein in the case that a path loss of large-scale information for the QCL relationship is a first path loss, the path loss compensation factor is a first path loss compensation factor and the target received power is first target received power, or the path loss compensation factor is a second path loss compensation factor and the target received power is second target received power; and
   in the case that fading of the large-scale information is a second path loss, the path loss compensation factor is a third path loss compensation factor and the target received power is third target received power,
   wherein the first path loss is greater than the second path loss, the first path loss compensation factor is greater than the third path loss compensation factor, the first target received power is greater than the third target received power, the second path loss compensation factor is smaller than the third path loss compensation factor, and the second target received power is smaller than the third target received power.

4. The power control parameter configuration method according to claim 1, wherein the power control parameter comprises one or more power control parameters indicating at least one of a Physical Uplink Control Channel (PUCCH), a Physical uplink shared channel (PUSCH) or a Sounding Reference Signal (SRS), and the power control parameters indicating at least one of the PUCCH, the PUSCH or the SRS in the configuration information are configured independently or in a jointly manner.

5. The power control parameter configuration method according to claim 1, wherein the power control parameter is one or more power control parameters in multiple power control parameters corresponding to one or more identifiers, the one or more identifiers comprise an identifier configured through the configuration information for the QCL relationship, and the multiple power control parameters are configured in advance; or the power control parameter is one or more power control parameters from a power control parameter set indicated by Downlink Control Information (DCI), and the power control parameter set is configured for the QCL relationship in advance.

6. The power control parameter configuration method according to claim 5, wherein the power control parameter comprises one or more power control parameters indicating at least one of a PUCCH, a PUSCH or an SRS, one or more identifiers of the one or more power control parameters for PUSCH are one or more identifiers configured through the configuration information, one or more identifiers of the one or more power control parameters for SRS are one or more identifiers configured through the configuration information or one or more identifiers configured in an SRS request, and one or more identifiers of the one or more power control parameters for PUCCH are one or more identifiers configured through the configuration information, Radio Resource Control (RRC) or a Medium Access Control Control Element (MAC CE).

7. A power control parameter configuration method, comprising:
configuring, by a network side device, (i) a power control parameter corresponding to a Quasi Co-Location (QCL) relationship, or (ii) a power control parameter and a path loss reference signal both corresponding to a Quasi Co-Location (QCL) relationship; and
indicating, by the network side device, the QCL relationship and the power control parameter to a terminal, or, indicating, by the network side device, the QCL relationship, the power control parameter and the path loss reference signal to a terminal,
wherein the power control parameter comprises at least one of a path loss compensation factor or a target received power,
wherein the power control parameter is a power control parameter carried in configuration information for the QCL relationship; or the power control parameter is a power control parameter obtained through performing a first operation on the power control parameter in the configuration information for the QCL relationship and a power control parameter stored in the terminal,
wherein in the case that a path loss of large-scale information for the QCL relationship is a first path loss, the path loss compensation factor is a first path loss compensation factor and the target received power is first target received power, or the path loss compensation factor is a second path loss compensation factor and the target received power is second target received power; and
in the case that fading of the large-scale information is a second path loss, the path loss compensation factor is a third path loss compensation factor and the target received power is third target received power,
wherein the first path loss is greater than the second path loss, the first path loss compensation factor is greater than the third path loss compensation factor, the first target received power is greater than the third target received power, the second path loss compensation factor is smaller than the third path loss compensation factor, and the second target received power is smaller than the third target received power.

8. The power control parameter configuration method according to claim 7, wherein in the case that the reference signal in the QCL relationship is a downlink reference signal, the path loss reference signal is the downlink reference signal, or in the case that the reference signal in the QCL relationship is an uplink reference signal, the path loss reference signal is a QCL downlink reference signal for the uplink reference signal.

9. The power control parameter configuration method according to claim 7, wherein the power control parameter comprises one or more power control parameters indicating at least one of a Physical Uplink Control Channel (PUCCH), a Physical uplink shared channel (PUSCH) or a Sounding Reference Signal (SRS), and the power control parameters indicating at least one of the PUCCH, the PUSCH or the SRS in the configuration information are configured independently or in a jointly manner.

10. The power control parameter configuration method according to claim 7, wherein the power control parameter is one or more power control parameters in multiple power control parameters corresponding to one or more identifiers, the one or more identifiers comprise an identifier configured through the configuration information for the QCL relationship, and the multiple power control parameters are configured in advance; or the power control parameter is one or more power control parameters from a power control parameter set indicated by Downlink Control Information (DCI), and the power control parameter set is configured for the QCL relationship in advance.

11. The power control parameter configuration method according to claim 10, wherein the power control parameter comprises one or more power control parameters indicating at least one of a PUCCH, a PUSCH or an SRS, one or more identifiers of the one or more power control parameters for PUSCH are one or more identifiers configured through the configuration information, one or more identifiers of the one or more power control parameters for SRS are one or more identifiers configured through the configuration information or one or more identifiers configured in an SRS request, and one or more identifiers of the one or more power control parameters for PUCCH are one or more identifiers configured through the configuration information, Radio Resource Control (RRC) or a Medium Access Control Control Element (MAC CE).

12. A terminal, comprising a transceiver, a memory, a processor, and a program stored in the memory and executed by the processor, wherein the transceiver is configured to obtain a Quasi Co-Location (QCL) relationship indicated by a network side device for an uplink signal;
the transceiver or the processor is configured to determine
(i) a power control parameter corresponding to the QCL relationship, or (ii) a power control parameter and a path loss reference signal both corresponding to the QCL relationship; and the transceiver is further configured to determine uplink transmission power in accordance with the power control parameter, or, determining, by the terminal, uplink transmission power in accordance with both the power control parameter and the path loss reference signal, and transmit the uplink signal in accordance with the uplink transmission power, wherein the power control parameter comprises at least one of a path loss compensation factor or a target received power, wherein the power control parameter is a power control parameter carried in configuration information for the QCL relationship; or the power control parameter is a power control parameter obtained through performing a first operation on the power control parameter in the configuration information for the QCL relationship and a power control parameter stored in the terminal.

13. A network side device, comprising a transceiver, a memory, a processor, and a program stored in the memory and executed by the processor, wherein the transceiver or the processor is configured to implement steps in the power control parameter configuration method according to claim 7.

14. A non-transitory computer-readable storage medium storing therein a computer program, wherein the computer program is executed by a processor so as to implement steps in the power control parameter configuration method according to claim 1.

15. A non-transitory computer-readable storage medium storing therein a computer program, wherein the computer program is executed by a processor so as to implement steps in the power control parameter configuration method according to claim 7.

* * * * *